(12) United States Patent
Obermuller

(10) Patent No.: US 10,238,082 B2
(45) Date of Patent: Mar. 26, 2019

(54) TEAT CUP SHELL TEAT CUP AND ARRANGEMENT FOR AUTOMATICALLY MILKING ANIMALS

(71) Applicant: DELAVAL HOLDING AB, Tumba (SE)

(72) Inventor: Helmut Obermuller, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 219 days.

(21) Appl. No.: 15/025,903

(22) PCT Filed: Oct. 27, 2014

(86) PCT No.: PCT/SE2014/051265
§ 371 (c)(1),
(2) Date: Mar. 30, 2016

(87) PCT Pub. No.: WO2015/065275
PCT Pub. Date: May 7, 2015

(65) Prior Publication Data
US 2016/0212966 A1     Jul. 28, 2016

(30) Foreign Application Priority Data

Oct. 29, 2013 (SE) ...................................... 1351281

(51) Int. Cl.
*A01J 5/08* (2006.01)

(52) U.S. Cl.
CPC ...................................... *A01J 5/08* (2013.01)

(58) Field of Classification Search
CPC ........ A01J 5/04; A01J 5/06; A01J 5/16; A01J 5/08; A01J 7/00; A01J 5/00; B25J 15/06
(Continued)

(56) References Cited

U.S. PATENT DOCUMENTS

| 4,441,455 A * | 4/1984 | Lowry | ...................... A01J 5/08 |
| | | | 119/14.47 |
| 5,909,716 A * | 6/1999 | van der Lely | ............ A01J 3/00 |
| | | | 119/14.08 |

(Continued)

FOREIGN PATENT DOCUMENTS

| EA | 000915 B1 | 6/2000 |
| GB | 901 998 A | 7/1962 |

(Continued)

OTHER PUBLICATIONS

English-language translation of SU 1684032 A1.*

(Continued)

*Primary Examiner* — Lisa L Tsang
(74) *Attorney, Agent, or Firm* — Young & Thompson

(57) ABSTRACT

A teat cup shell (2) includes a substantially tubular body having a center axis (4). A plane (6) extending along the center axis (4) defines a first shell portion (8) and a second shell portion (10) on opposite sides of the plane (6). The first shell portion (8) includes a magnetic material, and an outer surface (12) adapted to abut against at least one surface of an electromagnetic device. The first shell portion (8) and the second shell portion (10) differ from each other with respect to material composition and/or material thickness. The amount of magnetic material in the first shell portion (8) is higher than in the second shell portion (10). Further, a teat cup and an arrangement for automatically milking animals includes at least one robot arm (32) adapted to attach the teat cup (16) to a teat of an animal.

18 Claims, 3 Drawing Sheets

(58) Field of Classification Search
USPC .......... 119/14.08, 14.1, 14.18, 14.38, 14.45, 119/14.46, 14.47, 14.49
See application file for complete search history.

(56) References Cited

U.S. PATENT DOCUMENTS

| | | | |
|---|---|---|---|
| 6,176,200 B1 | 1/2001 | Petterson | |
| 6,776,120 B1 * | 8/2004 | Chowdhury | A01J 5/08 119/14.46 |
| 8,807,080 B2 | 8/2014 | Van Den Berg | |
| 2008/0022933 A1 * | 1/2008 | Wase | A01J 5/0175 119/14.08 |
| 2010/0031889 A1 * | 2/2010 | Eriksson | A01J 5/003 119/14.02 |
| 2011/0226183 A1 * | 9/2011 | Hallstrom | A01J 5/0175 119/14.02 |

FOREIGN PATENT DOCUMENTS

| | | |
|---|---|---|
| RU | 2 473 211 C2 | 1/2013 |
| SU | 1684032 A1 | 10/1991 |
| SU | 1771616 A1 | 10/1992 |
| SU | 1777728 A1 | 11/1992 |
| WO | 96/11568 A2 | 4/1996 |
| WO | 00/72665 A1 | 12/2000 |
| WO | 2005/122753 A1 | 12/2005 |
| WO | 2010/072586 A2 | 7/2010 |
| WO | WO 2012/057678 A1 * | 5/2012 ............ A01J 5/017 |
| WO | 2013/095290 A1 | 6/2013 |
| WO | 2013/137735 A1 | 9/2013 |

OTHER PUBLICATIONS

International-Type Search Report, dated May 26, 2014, from corresponding PCT application.
International Search Report, dated Jan. 27, 2015, from corresponding PCT application.
Supplementary International Search Report, dated Dec. 29, 2015, from corresponding PCT application.

* cited by examiner

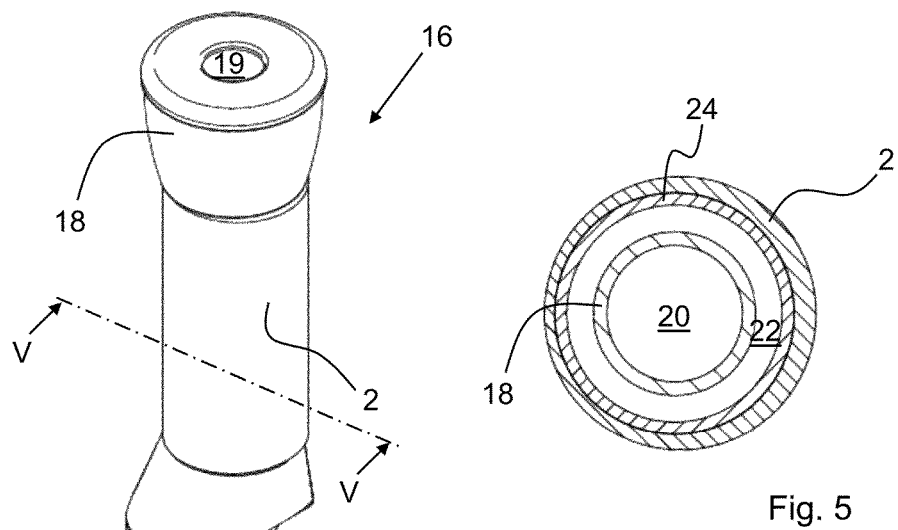
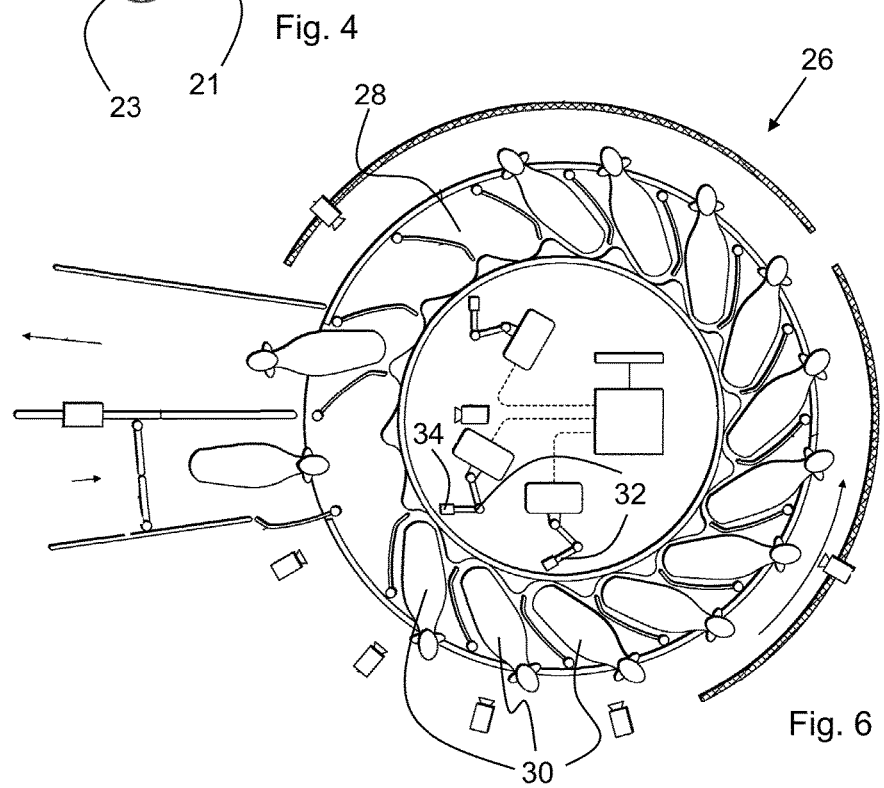

TEAT CUP SHELL TEAT CUP AND ARRANGEMENT FOR AUTOMATICALLY MILKING ANIMALS

TECHNICAL FIELD

The present invention relates to a teat cup shell for a teat cup adapted to be used for milking animals. The invention further relates to a teat cup, and to an arrangement for automatically milking animals comprising a teat cup.

BACKGROUND

A teat cup forms a part of a milking machine, which part is attached to a teat of an animal to be milked. Traditionally a teat cup comprises a resilient liner and a teat cup shell. The teat to be milked is placed in the liner at one end of the liner, and a vacuum is applied to an opposite end of the liner. The teat cup shell is arranged around a portion of the liner. Between the teat cup shell and the liner a pulsation chamber is formed. The pulsation chamber is alternately connected to a vacuum source and to atmospheric pressure.

Teat cups of a more complex construction are also known. For instance, WO 2013/095290 discloses such a teat cup comprising a connector and a cartridge. The cartridge comprises a sleeve, having a first end and a second end, and a teat cup liner mounted in the sleeve and having an inner space for receiving a teat. A pulsation chamber is formed in the cartridge. The connector is configured to connect a milk conduit to the cartridge.

In an arrangement for automatically milking animals, sometimes called a milking robot, teat cups are automatically attached to the teats of an animal to be milked. Commonly a robot arm of the arrangement handles the teat cups.

WO 2005/122753 discloses a gripper device mountable on a robot arm of a milking robot provided for automatically attaching teat cups to the teats of a milking animal. The gripper device comprises an electromagnet for gripping teat cups made of a magnetic material. The electromagnet includes a coil feedable with a current, a core of a magnetic material arranged at least partly within the coil, and a support structure for holding the electromagnet. The core comprises two end portions in a single face of the electromagnet, wherein the two end portions constitute different poles of the electromagnet, and are shaped to be engagable with a teat cup in a close fit.

In an arrangement for automatically milking animals comprising an electromagnetic device for handling a teat cup, such as the above mentioned gripper device, the holding force between the electromagnetic device and a relevant teat cup sets a limit for the movements to be performed by the robot arm when handling the teat cup. Due to the inertia of the teat cup and the flexible milk tube attached thereto, sudden directional changes of the robot arm may cause the electromagnetic device to lose the teat cup. Moreover, an animal being milked may accidentally knock the teat cup out of the electromagnetic device.

SUMMARY

It is an object of the present invention to provide a strong holding force between a teat cup shell of a teat cup and an electromagnetic device for handling a teat cup.

According to an aspect of the invention, the object is achieved by a teat cup shell adapted to form at least a part of an outer limiting portion of a teat cup and being adapted to be held by an electromagnetic device. The teat cup shell comprises a substantially tubular body having a centre axis. A plane extending along the centre axis defines a first shell portion and a second shell portion on opposite sides of the plane. The first shell portion comprises a magnetic material, and an even outer surface adapted to abut against at least one surface of the electromagnetic device. The first shell portion and the second shell portion differ from each other with respect to material composition and/or material thickness. The amount of magnetic material in the first shell portion is higher than in the second shell portion.

Since the first shell portion comprises a magnetic material and the first shell portion and the second shell portion differ from each other with respect to material composition and/or material thickness, there is provided a teat cup shell for a teat cup, which combines a specific weight of the teat cup shell with a strong magnetic holding force against the electromagnetic device at the first shell portion. As a result, the above mentioned object is achieved.

It has been realized by the inventor that the holding force of an electromagnetic device may only be increased to a certain extent within the physically available space at an end of a robot arm, and while remaining within desired upper electric power limits. It has further been realized by the inventor that an asymmetrical teat cup shell permits the weight of the teat cup shell to be kept within a desired range while providing enough magnetic material in the portion of the teat cup shell abutting against the electromagnetic device to ensure a strong holding force within the above mentioned constraints of the electromagnetic device. That is, the amount of magnetic material in the teat cup shell in the first shell portion is higher than in the second shell portion. It is to be understood that this encompasses embodiments without any magnetic material in the second shell portion.

The teat cup may form a part of a milking machine and be adapted to be attached to a teat of an animal to be milked. A teat cup liner is arranged inside the teat cup shell. The teat to be milked is placed in the liner at one end of the liner, and a vacuum is applied to an opposite end of the liner by the milking machine. The milking machine may form part of an arrangement for automatically milking animals. The arrangement for automatically milking animals may comprise at least one robot arm with an electromagnetic device for handling the teat cup.

The term "teat cup shell" encompasses a part adapted to form an outer portion of a teat cup and adapted to be held by an electromagnetic device, or by a human operator should so be required. A teat cup shell may form a part which is removable from other parts of a teat cup. Alternatively, a teat cup shell may form an integrated part of a teat cup, which integrated part may not be removed from other parts of a teat cup without rupturing the teat cup. The term "teat cup liner", or simply "liner", encompasses a resilient part of a teat cup adapted to receive a teat of an animal. A teat cup liner may be removable from other parts of a teat cup.

Alternatively, the teat cup liner may form an integrated part of a teat cup, which integrated part may not be removed from other parts of a teat cup without rupturing the teat cup. The term magnetic material refers to a material which is attracted to a magnet.

According to embodiments, the first shell portion may have a higher weight than the second shell portion. In this manner a larger amount of a total desired weight of the teat cup shell may emanate from the first shell portion than from the second shell portion. Accordingly, the first shell portion may comprise a larger amount of magnetic material than the second shell portion to ensure a strong magnetic holding force within the desired weight constraints. These embodiments encompass in particular a teat cup shell comprising a circumferential layer made from magnetic material, but encompass also a teat cup shell comprising magnetic material homogenously mixed with a plastic material.

According to embodiments, the teat cup shell may comprise a substantially circular outer cross section seen along the centre axis. The electromagnetic device may have a corresponding concave contact surface adapted to abut closely with the teat cup shell. In this manner, the contact between the teat cup shell and the electromagnetic device may be the same irrespective of the angular position of the teat cup shell around its centre axis. Small angular differences in the position of the teat cup shell, when held by the electromagnetic device, will not affect the magnetic holding force to any substantial extent.

According to embodiments, the second shell portion comprises a magnetic material, and at least a portion of the first shell portion has a thicker material thickness than the second shell portion. In this manner, a strong magnetic force between the electromagnetic device and the first shell portion may be ensured within the weight constraints of the teat cup shell. These embodiments encompass a teat cup shell comprising a circumferential layer made from magnetic material, as well as e.g. a teat cup shell comprising magnetic material homogenously mixed with a plastic material.

According to embodiments, at least a portion of the first shell portion may have a material thickness of 2-6 mm, and the second shell portion may have a material thickness of 1-3 mm. In this manner, a strong teat cup shell within a desired weight range may be provided.

According to embodiments, the second shell portion may comprise a plastic material, such as a polymer.

According to embodiments, the first shell portion may comprise a plastic material, such as a polymer.

According to embodiments, the magnetic material of the first shell portion may comprise a ferritic stainless steel material. In this manner, a stainless first shell portion having magnetic properties may be provided. Similarly, the second shell portion may comprise a ferritic stainless steel material. The entire teat cup shell may be made form a ferritic stainless steel material.

According to a further aspect of the invention, there is provided a teat cup comprising a teat cup shell and a teat cup liner. The teat cup shell is a teat cup shell according to aspects and/or embodiments disclosed herein. In this manner, a teat cup providing a strong magnetic holding force against an electromagnetic device at the first shell portion is provided.

According to a further aspect of the invention there is provided an arrangement for automatically milking animals comprising at least one robot arm adapted to attach at least one teat cup to a teat of an animal. The robot arm comprises an electromagnetic device adapted to handle the at least one teat cup. The arrangement comprises a least one teat cup according to aspects and/or embodiments disclosed herein. In this manner, an arrangement for automatically milking animals providing a strong magnetic holding force between the electromagnetic device and the at least one teat cup may be provided.

According to embodiments, the arrangement comprises a teat cup magazine adapted to store the at least one teat cup during non-milking periods. The teat cup magazine may be adapted to always store the at least one teat cup with the first shell portion facing in one and the same direction to ensure the electromagnetic device abutting against the first shell portion. In this manner, a reliable picking up of the teat cup may be ensured.

According to embodiments, the teat cup magazine may comprise a first roller and a second roller extending substantially in parallel. The at least one teat cup may comprise a first surface and a second surface extending substantially perpendicularly to the centre axis of the teat cup shell. The first surface may be adapted to abut against the first roller and the second surface may be adapted to abut against the second roller when the at least one teat cup is stored in the teat cup magazine. In this manner, it may be ensured that the at least one teat cup is always stored with the first shell portion facing in one and the same direction.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIG. 4 illustrates a teat cup according to embodiments, FIG. 5 illustrates a cross section through the teat cup shell in FIG. 4, FIG. 6 illustrates an arrangement for automatically milking animals according to embodiments.

DETAILED DESCRIPTION

Aspects of the present invention will now be described more fully. Like numbers refer to like elements throughout. Well-known functions or constructions will not necessarily be described in detail for brevity and/or clarity.

Figure 1:
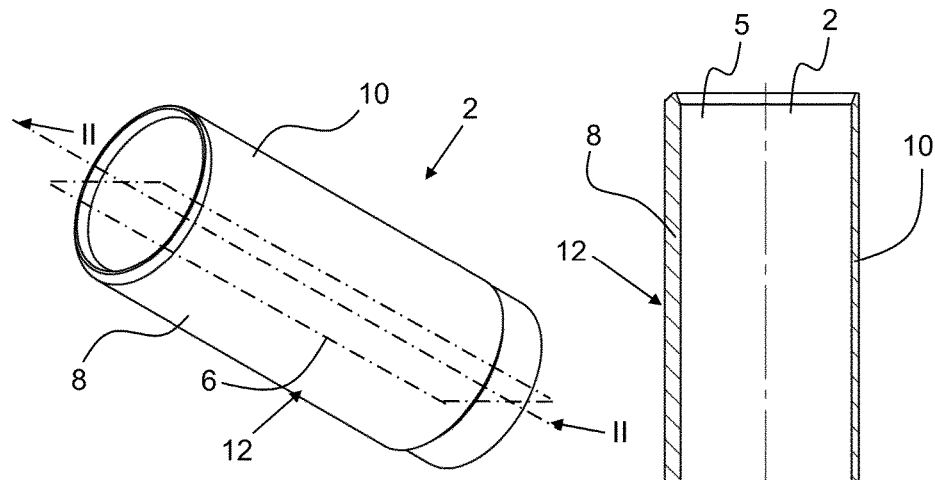
FIG. 1 illustrates a teat cup shell according to embodiments.
Figure 2:
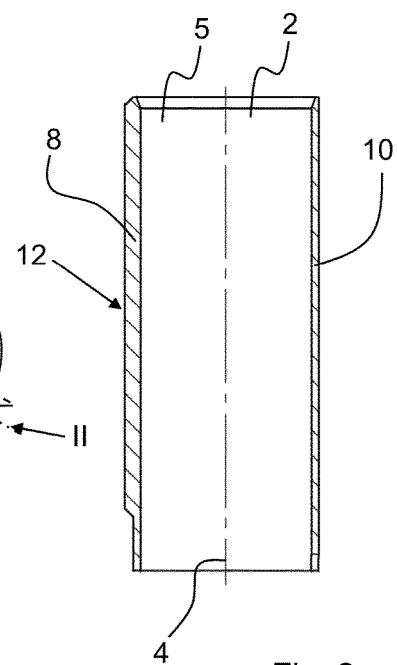
FIG. 2 illustrates a cross section through the teat cup shell in FIG. 1.

FIG. 1 illustrates a teat cup shell 2 according to embodiments. FIG. 2 illustrates a cross section through the teat cup shell 2 in FIG. 1 along line II-II. The teat cup shell 2 is adapted to form at least part of an outer limiting portion of a teat cup, such as the teat cup illustrated in FIG. 3. The teat cup shell 2 comprises a substantially tubular body 5 having a centre axis 4. A plane 6 extends along the centre axis 4 and defines a first shell portion 8 and a second shell portion 10, on opposite sides of the plane 6. In FIG. 2 the plane extends through the centre axis 4, into and out of the cross section illustrated in FIG. 2, i.e. the first and the second shell portions 8, 10 are arranged on opposite sides of the line indicating the centre axis 4. The first shell portion 8 comprises an even outer surface 12 adapted to abut against at least one surface of an electromagnetic device. The first shell portion 8 and the second shell portion 10 differ from each other with respect to material thickness. The first shell portion 8 is thicker than the second shell portion 10. Thus, the first shell portion 8 has a higher weight than the second shell portion 10. In total the teat cup shell 2 has a weight similar to that of a teat cup shell with an even shell thickness lying between the thicknesses of the first and second shell portions 8, 10.

The teat cup shell 2 comprises a magnetic material, and is thus adapted to be held by an electromagnetic device. That is, the first shell portion 8 comprises a magnetic material. Also the second shell portion 10 comprises a magnetic material. The entire teat cup shell 2 may be made from a magnetic material. Thus, the teat cup shell 2 forms a circumferential layer made from magnetic material. The magnetic material may for instance be a ferritic stainless steel. An alternative material may be carbon steel, in which case the surface of the teat cup shell 2 may be coated with a non-corroding material, e.g. chromium or a carbide.

The teat cup shell 2 comprises a substantially circular outer cross section seen along the centre axis 4. Similarly, the teat cup shell 2 comprises a substantially circular inner cross section seen along the centre axis 4. The substantially circular inner cross section is offset in relation to the substantially circular outer cross section. In this manner the thicker thickness of the first shell portion 8 in relation to the thickness of the second shell portion 10 is achieved. As illustrated in FIG. 2, the substantially circular inner cross section is offset to the right in relation to the substantially circular outer cross section.

Figure 3:
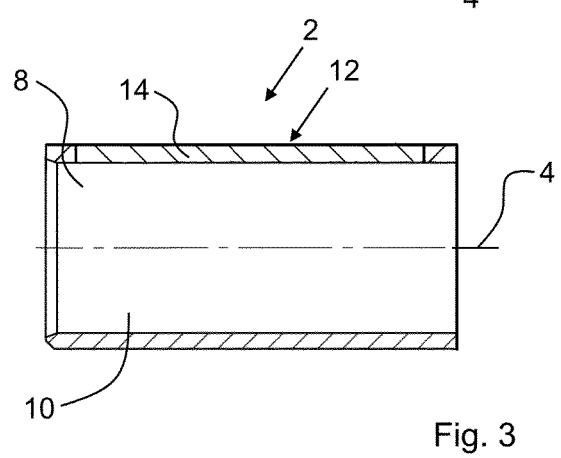
FIG. 3 illustrates a cross section through a teat cup shell according to embodiments.

FIG. 3 illustrates a cross section through a teat cup shell 2 according to embodiments. Again, the teat cup shell 2 is adapted to form at least part of an outer limiting portion of a teat cup. The teat cup shell 2 comprises a substantially tubular body having a centre axis 4. A plane extends along the centre axis 4 and defines a first shell portion 8 and a second shell portion 10, on opposite sides of the plane 6. In FIG. 3 the plane extends through the centre axis 4, into and out of the cross section illustrated in FIG. 3, i.e. the first and the second shell portions 8, 10 are arranged on opposite sides of the line indicating the centre axis 4. The first shell portion 8 comprises an even outer surface 12 adapted to abut against at least one surface of an electromagnetic device.

The first shell portion 8 comprises a plastic material. The second shell portion 10 comprises a plastic material. The plastic material may comprise a polymer with low elasticity, such as polyethylene, polypropylene, etc. The first shell portion 8 comprises a bar 14 of a magnetic material embedded in the plastic material of the first shell portion 8. Thus, the teat cup shell 2 is adapted to be held by an electromagnetic device. Also, in this manner the first shell portion 8 and the second shell portion 10 differ from each other with respect to material composition.

FIG. 4 illustrates a teat cup 16 according to embodiments. FIG. 5 illustrates a cross section through the teat cup shell 2 in FIG. 4 along line V-V. The teat cup 16 comprises a teat cup shell 2 and a teat cup liner 18. The teat cup shell 2 is a teat cup shell 2 as disclosed in connection with FIGS. 1 and 2. Alternatively, the teat cup shell 2 may be a teat cup shell 2 as disclosed in connection with FIG. 3.

Inside the liner 18 a teat space 20 is formed. A teat of an animal is inserted into the liner 18 through an opening in 19. Between the liner 18 and the teat cup shell 2 a pulsation space 22 is formed. A milk line and a pulsation line, forming a flexible milk tube of a milking machine, may be connected to the teat cup 16. The milk line is connected to the teat space 20 via a first connection 21 and the pulsation line is connected to the pulsation space 22 via a second connection 23.

An inner layer 24 is formed inside the teat cup shell 2. The inner layer 24 may comprise a plastic material and abuts against the magnetic material of the teat cup shell 2. Accordingly, an outer portion of the teat cup shell 2 forms a circumferential layer made from magnetic material. The inner layer 24 may form part of the teat cup shell 2. The inner layer 24 may form an integrated unit with the teat cup liner 18. The teat cup liner 18 may comprise a resilient material such as rubber, black rubber, silicone rubber, elastic polymers, such as thermoplastic elastomers, TPE, or any other suitable elastic material. The plastic material of the inner layer 24 may comprise a polymer with low elasticity, such as polyethylene, polypropylene, etc.

FIG. 6 illustrates an arrangement 26 for automatically milking animals according to embodiments. In these embodiments the arrangement comprises a rotary platform 28 upon which the animals 30 stand while being milked. The arrangement 26 for automatically milking animals comprises at least one robot arm 32 adapted to attach at least one teat cup to a teat of an animal 30. The robot arm 32 comprises an electromagnetic device 34 adapted to handle the at least one teat cup. A teat cup magazine is arranged next to each milking position on the rotary platform 28.

Figure 7:
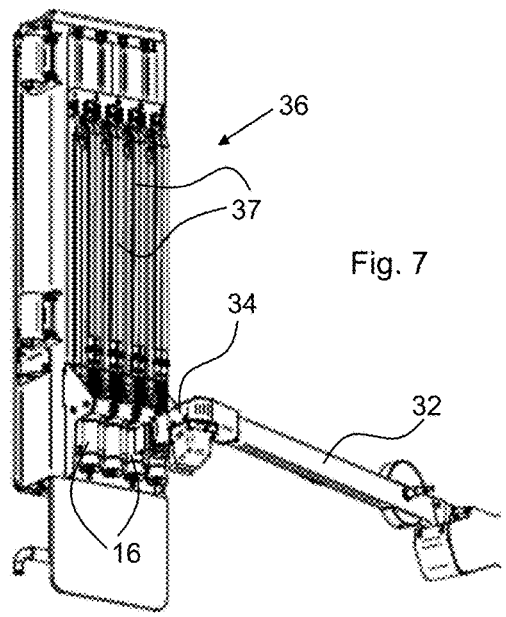
FIG. 7 illustrates a teat cup magazine of the arrangement of FIG. 6.

FIG. 7 illustrates a teat cup magazine 36 of the arrangement 26 of FIG. 6. The teat cup magazine 36 is adapted to store at least one teat cup 16 during non-milking periods. The at least one teat cup 16 is a teat cup 16 according to aspects and/or embodiments disclosed herein. In these embodiments the teat cup magazine 36 is adapted to store four teat cups 16. Flexible milk tubes 37 are connected to the teat cups 16. In FIG. 7 a robot arm 32 comprising an electromagnetic device 34 is about to pick a teat cup 16 from the magazine 36. Each flexible milk tube 37 comprises two conduits in a side-by-side arrangement. Thus, the flexible milk tube 37 will twist about its longitudinal direction only to a limited degree, in particular in the teat cup magazine 36 where the flexible milk tube 37 abuts against one or more supporting elements.

Figure 8:
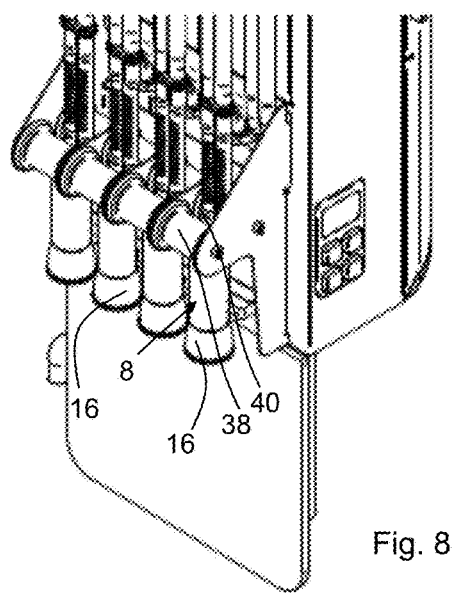
FIG. 8 illustrates a portion of the teat cup magazine of FIG. 7.

FIG. 8 illustrates a portion of the teat cup magazine 36 of FIG. 7. The teat cup magazine 36 is adapted to always store the teat cups 16 with the first shell portion 8 facing in one and the same direction to ensure that the magnetic device 34 abuts against the first shell portion 8. For this purpose the teat cup magazine 36 comprises a first roller 38 and a second roller 40 extending substantially in parallel.

Figure 9:
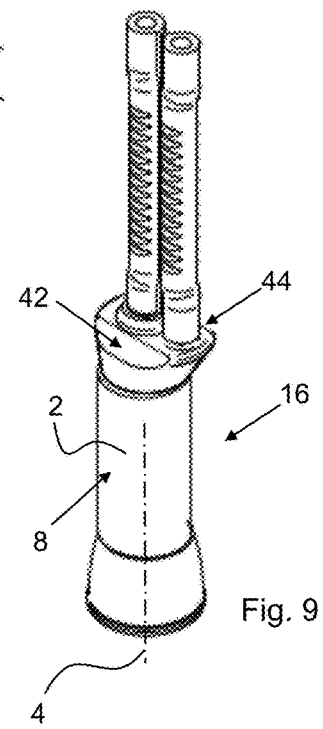
FIG. 9 illustrates a teat cup of the teat cup magazine of FIGS. 7 and 8.

FIG. 9 illustrates a teat cup 16 of the teat cup magazine 36 of FIGS. 7 and 8. The teat cup 16 comprises a first surface 42 and a second surface 44, both extending substantially perpendicularly to a centre axis 4 of a teat cup shell 2 of the teat cup 16. The first surface 42 is adapted to abut against the first roller 38 and the second surface 44 is adapted to abut against the second roller 40 when the teat cup 16 is stored in the teat cup magazine 36, see FIG. 8.

As illustrated in FIG. 7, a teat cup 16 is collected from the magazine 36 by the robot arm 32. The teat cup 16 is connected to a teat of an animal. After milking has been completed, the teat cup 16 is retracted by its flexible milk tube 37 into the teat cup magazine 36 to abut with its first and second surfaces 42, 44 against the first and second rollers 38, 40, to store the teat cup 16 with the first shell portion 8 accessible for renewed abuttal against the electromagnetic device 34 of the robot arm 32 during attachment of the teat cup 16 to a subsequent teat.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims.

For instance, the teat cup shell may have a different cross-section shape than round, e.g. square or oval. Although the invention has been described with reference to example embodiments, many different alterations, modifications and the like will become apparent for those skilled in the art. For instance, the arrangement for automatically milking animals may be an arrangement for milking only one animal at a time comprising a milking stall housing one animal. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A teat cup shell (2) adapted to form at least a part of an outer limiting portion of a teat cup and being adapted to be held by an electromagnetic device, the teat cup shell (2) comprising:
a tubular body (5) having a center axis (4),
wherein the tubular body (5) comprises an outer circumferential magnetic layer comprised of a magnetic material,
wherein a plane (6) extending along the center axis (4) defines a first shell portion (8) and a second shell portion (10) on opposite sides of the plane (6),
wherein the first shell portion (8) comprises a first part of the outer circumferential magnetic layer,
wherein the second shell portion (10) comprises a second part of the outer circumferential magnetic layer,
wherein the first part of the outer circumferential magnetic layer defines an outer surface (12) adapted to, when engaging with the electromagnetic device, abut against at least one surface of the electromagnetic device with the electromagnetic device magnetically holding the tubular body (5) along an exterior surface of the first part of the outer circumferential magnetic layer magnetic material,
wherein the first shell portion (8) and the second shell portion (10) differ from each other with respect to at least material thickness, such that at least a portion of a thickness of the first part of the outer circumferential magnetic layer is higher than a greatest thickness of the second part of the outer circumferential magnetic layer, and an amount of the magnetic material in the first shell portion (8) is higher than in the second shell portion (10), and
wherein the outer circumferential magnetic layer has a circular outer cross section and a circular inner cross section when seen along the center axis (4), with the circular inner cross section being offset in relation to the circular outer cross section.

2. The teat cup shell (2) according to claim 1, wherein the first shell portion (8) has a higher weight than the second shell portion (10).

3. The teat cup shell (2) according to claim 1, further comprising an inner plastic layer (24) abutting against an inside surface of the outer circumferential magnetic layer.

4. The teat cup shell (2) according to claim 3, wherein at least a portion of the first shell portion (8) has a material thickness of 2-6 millimeters, and the second shell portion (10) has a material thickness of 1-3 millimeters.

5. The teat cup shell (2) according to claim 1, wherein the second shell portion (10) comprises a plastic material.

6. The teat cup shell (2) according to claim 5, wherein the first shell portion (8) comprises a plastic material.

7. The teat cup shell (2) according to claim 1, wherein the magnetic material comprises a ferritic stainless steel material.

8. A teat cup (16) comprising the teat cup shell (2) according to claim 1 and a teat cup liner (18).

9. An arrangement (26) for automatically milking animals comprising at least one robot arm (32) adapted to attach at least one of the teat cup (16) according to claim 8 to a teat of an animal, the at least one robot arm (32) comprising the electromagnetic device (34) adapted to handle the at least one teat cup (16).

10. The arrangement (26) according to claim 9, further comprising a teat cup magazine (36) adapted to store the at least one teat cup (16) during non-milking periods, wherein the teat cup magazine (36) is adapted to always store the at least one teat cup (16) with the first shell portion (8) facing outward toward the electromagnetic device (34) to ensure the electromagnetic device (34), when engaging with the at least one teat cup (16), abuts against the first shell portion (8) of the at least one teat cup (16).

11. The arrangement (26) according to claim 10,
wherein the teat cup magazine (36) comprises a first roller (38) and a second roller (40) extending in parallel with each other,
wherein the at least one teat cup (16) comprises a first surface (42) and a second surface (44) extending perpendicularly to the center axis (4) of the teat cup shell (2), and
wherein the first surface (42) is adapted to abut against the first roller (38) and the second surface (44) is adapted to abut against the second roller (40) when the at least one teat cup (16) is stored in the teat cup magazine (36).

12. The teat cup shell (2) according to claim 1, wherein the outer circumferential layer is asymmetrical with the circular outer cross section offset from a circular inner cross section when seen along the center axis (4).

13. The teat cup shell (2) according to claim 1, wherein a material composition of the first shell portion (8) and the second shell portion (10) is the same.

14. The teat cup shell (2) according to claim 1, wherein the outer surface (12) of the first shell portion (8) is an even surface.

15. The teat cup shell (2) according to claim 1, wherein the first shell portion (8) and the second shell portion (10) differ from each other with respect to a material composition and the material thickness.

16. The teat cup shell (2) according to claim 1,
wherein the first shell portion (8) and the second shell portion (10) do not differ from each other with respect to the material composition.

17. A teat cup shell (2) adapted to form at least a part of an outer limiting portion of a teat cup and being adapted to be held by an electromagnetic device, the teat cup shell (2) comprising:
a tubular body (5) having a center axis (4),
wherein the tubular body (5) comprises an outer circumferential layer,
wherein a plane (6) extending along the center axis (4) defines a first shell portion (8) and a second shell portion (10) on opposite sides of the plane (6),
wherein the first shell portion (8) comprises a first part of the outer circumferential layer and the second shell portion (10) comprises a second part of the outer circumferential layer, wherein the first part of the outer circumferential layer comprises a magnetic material and the second part of the outer circumferential layer is magnetic material free, wherein the first part of the outer circumferential layer defines an outer surface (12) adapted to, when engaging with the electromagnetic device, abut against at least one surface of the electromagnetic device with the electromagnetic device magnetically holding the tubular body (5) along an exterior surface of the first part of the outer circumferential layer material, and wherein the first shell portion (8) and the second shell portion (10) differ from each other with respect to at least material thickness, such that at least a portion of a thickness of the first part of the outer circumferential layer is higher than a greatest thickness of the second part of the outer circumferential layer, and an amount of the magnetic material in the first shell portion (8) is higher than in the second shell portion (10), and the outer circumferential layer is asymmetrical with a circular outer cross section offset from a circular inner cross section when seen along the center axis (4).

18. The teat cup shell (2) according to claim 17, further comprising an inner plastic layer (24) abutting against an inside surface of the outer circumferential layer, and wherein, at least a portion of the first shell portion (8) has a material thickness of 2-6 millimeters, and the second shell portion (10) has a material thickness of 1-3 millimeters.

\* \* \* \* \*